United States Patent
Alma et al.

(10) Patent No.: US 12,398,578 B2
(45) Date of Patent: Aug. 26, 2025

(54) TELESCOPIC TENT POLE

(71) Applicant: Thule Sweden AB, Hillerstorp (SE)

(72) Inventors: Jord Alma, Öxnevalla (SE); Harry Holder, Skillingaryd (SE)

(73) Assignee: Thule Sweden AB, Hillerstorp (SE)

( * ) Notice: Subject to any disclaimer, the term of this patent is extended or adjusted under 35 U.S.C. 154(b) by 581 days.

(21) Appl. No.: 17/533,768

(22) Filed: Nov. 23, 2021

(65) Prior Publication Data

US 2022/0170287 A1    Jun. 2, 2022

(30) Foreign Application Priority Data

Dec. 1, 2020   (DE) .................. 20 2020 106 924.1

(51) Int. Cl.
 *E04H 15/46* (2006.01)
 *E04H 15/06* (2006.01)
 *E04H 15/60* (2006.01)

(52) U.S. Cl.
 CPC ............ *E04H 15/46* (2013.01); *E04H 15/06* (2013.01); *E04H 15/60* (2013.01)

(58) Field of Classification Search
 CPC ................................ E04H 15/46; E04H 15/60
 USPC ........................................ 135/140, 142, 114
 See application file for complete search history.

(56) References Cited

U.S. PATENT DOCUMENTS

| | | | | |
|---|---|---|---|---|
| 8,746,267 B2 * | 6/2014 | Lovley, II | ............ | F16B 7/1454 |
| | | | | 135/120.2 |
| 10,378,235 B1 * | 8/2019 | Volin | ...................... | E04H 15/46 |
| 10,428,550 B2 * | 10/2019 | Huang | ..................... | E04H 15/42 |
| 2003/0094833 A1 * | 5/2003 | Thompson | .............. | E04H 15/08 |
| | | | | 296/173 |
| 2006/0102218 A1 * | 5/2006 | Kwon | ..................... | F16B 7/042 |
| | | | | 135/114 |
| 2020/0165837 A1 * | 5/2020 | Long | ...................... | E04H 15/38 |
| 2024/0084618 A1 * | 3/2024 | Lee | ......................... | E04H 15/60 |

FOREIGN PATENT DOCUMENTS

| CN | 204983891 U | | 1/2016 | | |
| WO | WO-2015028467 A1 | * | 3/2015 | .......... | E04F 10/0603 |
| WO | WO-2023068667 A1 | * | 4/2023 | ............. | E04H 15/60 |
| WO | WO-2023163443 A1 | * | 8/2023 | ............. | E04H 15/46 |

* cited by examiner

*Primary Examiner* — David R Dunn
*Assistant Examiner* — Danielle Jackson
(74) *Attorney, Agent, or Firm* — Sterne, Kessler, Goldstein & Fox P.L.L.C.

(57) ABSTRACT

The present disclosure relates to a telescopic tent pole extendable between an extended and collapsed state, in particular for a vehicle roof top tent. The tent pole includes a first pole element and a second pole element connected to each other and moveable relative to each other in an axial direction to extend or collapse the tent pole. The tent pole further includes a fixation device configured to be adjustable between a blocking state and a release state, with the fixation device biased towards its blocking state. The fixation device, in its blocking state, is configured to prevent collapsing of the tent pole in the extended state or at least one intermediate state of the tent pole. Alternatively, the fixation device, in its blocking state, is configured to permit further extending of the tent pole towards its extended state in the intermediate state of the tent pole.

13 Claims, 6 Drawing Sheets

TELESCOPIC TENT POLE

CROSS REFERENCE TO RELATED APPLICATION

This application claims priority to DE Application No. 20202010692401, filed Dec. 1, 2020, which is incorporated herein by reference in its entirety.

TECHNICAL FIELD

The present invention relates to a telescopic tent pole and a tent pole element as well as their uses. The invention further relates to a tent and a method of erecting a foldable roof top tent.

BACKGROUND

Usually, tents comprise one or more tent poles to support a canopy. An interior space of the erected tent provides protection from environmental effects, such as rain and wind, for living, sleeping and/or storage of goods. When the tent is not in use, there is a need to store the tent in a space-saving manner, for example for transport. While the canopy usually comprises a somewhat limp fabric and may be easily folded and/or crumpled together, the tent poles are rigid to be able to support the weight of the canopy while using the tent. Hence the tent poles may limit the minimum storage size of a tent, in particular at least in one dimension.

Additionally, providing a sufficiently rigid tent pole for large and/or sturdy tents may require large and/or heavy tent poles, which further limits the portability of a tent.

CN 204983891 U shows a telescopic tent pole. However, extending and/or collapsing this tent pole may be cumbersome, especially in large tents and/or if the difference in length between an extended and collapsed state of the tent pole is large.

BRIEF SUMMARY

A first aspect relates to a telescopic tent pole extendable between an extended and collapsed state, in particular for a vehicle roof top tent. The tent pole may comprise a first pole element and a second pole element connected to each other, for example due to one of the two pole elements being inserted into the other. The first and second pole element may be moveably relatively to each other in an axial direction to extend or collapse the tent pole. The tent pole may further comprise a fixation device configured to be adjustable between a blocking state and a release state. The fixation device may be configured to be biased towards its blocking state. The fixation device, in its blocking state, may be configured to prevent collapsing of the tent pole in the extended state. The fixation device, in its blocking state, may be configured to prevent collapsing of the tent pole in at least one intermediate state of the tent pole. The intermediate state may be a state of the tent pole between its collapsed state and its extended state. For example, the intermediate state may be a state where the telescopic tent pole is extended only halfway or three quarters of the way to its extended state. The intermediate state may be a predetermined state and not a randomly chosen position between the collapsed and extended state. The blocking device may be configured not to be able to enter its blocking state except in predetermined state of the tent pole, such as the extended state and/or intermediate state. The fixation device, in its blocking state, may be configured to permit further extending of the tent pole towards its extended state in the intermediate state of the tent pole. For example, no actuation of a release of the fixation device is required to further extend the tent pole from the intermediate state.

The telescopic tent pole is comfortable to use due to the fixation device preventing the tent pole from collapsing from the intermediate state. This allows a user to partially extend a pole to its intermediate state, in which the canopy can already be held by the tent pole and an interior space may already be provided. In the intermediate state, the tent pole may not collapse under the canopy load. Hence, a user may extend other tent poles while this tent pole remains in the intermediate state. This may also prevent unwanted tensioning and jamming of tent poles that could otherwise occur if a user would be required to first fully extend one tent pole before being able to extend another tent pole. Similarly, no tent pole must be held manually in an intermediate state. This may also facilitate erecting a tent with just one person. Additionally, the intermediate state may allow to nearly fully erect a tent and only extend the tent poles into their extended state to further stretch and thus tighten the canopy. This may improve weather resistance while not resulting in a tent difficult to erect. The fixation device also does not need to be manually released if a user wishes to extend the tent pole further from the intermediate state, allowing very intuitive adjustment of the telescopic tent pole. The telescopic tent pole also allows a very compact storage of a tent in its collapsed state.

The pole elements may be hollow and/or rigid. For example, the pole elements may be formed from a metallic material. For example, the pole elements may be hollow metal tubes. One of the first and second pole elements may be partially arranged within the other of the first and second pole elements. The roof top tent may be a foldable roof top tent, in particular with a book style folding mechanism. In the extended state, the telescopic tent pole may have a long length, in particular its longest length. In the collapsed state, the telescopic tent pole may have a short length, in particular its shortest length. In the intermediate state, the telescopic tent pole may have an intermediate length, in particular a length between the length of the telescopic tent pole in the extended and the collapsed state. The telescopic tent pole may be configured for manual extension and/or collapsing. Alternatively or additionally, extending and/or collapsing may be motor-assisted and/or spring-assisted. Adjustment of the tent pole, in particular its length and/or state, may involve axially moving at least one of the two pole elements, in particular such that the one pole element is further pushed into the other pole element or further pulled out of the other pole element. This may cause an overall length of the tent pole to change.

The fixation device may be configured to prevent movement of the two pole elements relative to each other in the blocking position only in certain states of the tent pole, which may correspond to certain positions of the two pole elements relative to each other. The tent pole may also have more than one intermediate state. In this case, the intermediate states may be spaced apart from each other. This allows a user to adjust the length of a tent pole more flexibly and/or adjust the tightness of a canopy of a tent according to current needs.

The fixation device may be configured, in particular because it is biased towards its blocking state, to automatically enter the blocking state at the intermediate position. The fixation device, in its blocking state, may be configured to prevent further extending of the tent pole in its extended state. This may predetermine a maximum length of the tent pole and may prevent unwanted disassembly of the tent pole. The fixation device, in its release state, may be configured to permit collapsing the tent pole, in particular in each state of the tent pole. Generally, the fixation device, in its release state, may be configured to permit collapsing and/or extending the tent pole from a certain state in a direction not permitted by the fixation device in its blocking state. The fixation device, in its blocking state, may be configured to prevent extending of the tent pole from its collapsed state. Such a configuration may prevent unwantedly extending the tent pole when adjusting it between a storage position and a use position, for example when moving and/or pivoting the whole tent pole, as is often required in foldable vehicle roof top tents. However, the tent pole may also not be fixed at all in its collapsed state. The fixation device, in its blocking state, may be configured to prevent further collapsing of the tent pole in its collapsed state. This may predetermine a minimum length of the tent pole and/or prevent unwanted disassembly of the tent pole. Alternatively or additionally, the tent pole may be configured to prevent overextending beyond the extended state and/or collapsing beyond the collapsed state regardless of the fixation device state, for example by means of mechanical end stops. Generally speaking, in the blocking state, the fixation device may be configured to block movement of the two pole elements relative to each other from at least one of the tent pole states, such as the extended state and/or intermediate state, in at least one direction, such as the direction of collapsing. The fixation device may be permanently attached to one of the first and second pole elements. The fixation device may be configured to selectively engage the other one of the first and second pole elements when it is adjusted from its release state into its blocking state.

According to an embodiment of the tent pole, the at least one intermediate position can be predetermined by an engagement section of one of the poles elements, such as a hole or protrusion, to which the fixation device in its blocking state engages for preventing collapsing of the tent pole. In case of several intermediate positions, the one of the pole elements may have multiple spaced-apart engagement sections each corresponding to one intermediate position. The fixation device may not prevent collapsing in any relative position of the pole elements if not adjusted to its release position, but rather only in predetermined intermediate positions. The fixation device may be configured, in particular due to its bias, to automatically engage the engagement section at the intermediate position. The fixation device can self-adjust into the blocking state if the tent pole is in the intermediate position. Such self-adjustment may be limited to any intermediate state and optionally the extended and/or collapsed state. The fixation device may be configured to automatically disengage the engagement section at the intermediate position when the tent pole is extended further, for example by pulling on one of the first and second pole element.

According to an embodiment of the tent pole, the fixation device may comprise a blocking element, such as a pin or ball, configured for engaging one of the pole elements, and a biasing element, such as a spring or rubber element, configured to force the blocking element into engagement with one of the first and second pole element. The fixation device may be attached to one of the pole elements. For example, the fixation device may comprise an attachment sleeve that is attached to an end section of one of the first and second pole element, for example with a snap coupling. The attachment sleeve may be a plastic part. For example, the blocking element may be pivotably attached to one pole element and/or the attachment sleeve, for example with a rivet or further pin. In particular, the fixation device may be attached to one of the two pole elements and the blocking element may engage the other of the two pole elements. The blocking element may, for example, be a metal part or a plastic part.

According to an embodiment of the tent pole, the blocking element may have a first engagement surface on a side of the blocking element facing in a direction permitting movement of the two pole elements relative to each other in the blocking state, in particular facing in an extension direction, wherein the first engagement surface is inclined relative to the direction permitting movement of the two pole elements relative to each other. Alternatively or additionally, the blocking element may have a second engagement surface on a side of the blocking element facing in a direction preventing movement in the blocking state, in particular facing in a collapsing direction, wherein the second engagement surface is facing towards the direction preventing movement of the two pole elements relative to each other. The inclined first engagement surface may be configured to cause disengagement and/or to cause adjustment of the fixation device into the release position when the tent pole is extended further from the intermediate position. The second engagement surface may be configured to prevent disengagement and/or to prevent adjustment of the fixation device into the release position when a user tries to collapse the tent pole from the intermediate position, for example by trying to push the two pole elements together. In view of the above, a section of the blocking element may be wedge-shaped.

According to an embodiment of the tent pole, at least one of the pole elements may have a non-circular cross section. For example, both or all pole elements may have a non-circular cross section. The non-circular shape may prevent unwanted rotation of the pole elements to each other, which could otherwise cause the fixation device not being able to enter its blocking state. Further, the non-circular shape may increase structural stability and/or protect the canopy of a tent. The cross section of the pole element may have an essentially trapezoidal cross-section and/or at least one corner. Alternatively, the cross-section may also be oval. For example, the pole element may be hollow and have a side wall forming the cross-section. For example, one of the first and second pole element may be configured for a matching fit in the other pole element. The form of the cross-sections of the pole elements may correspond to each other so that they may be inserted into each other.

According to an embodiment of the tent pole, the fixation device may comprise a release actuation element, such as a button or rocker switch, for adjusting the fixation device from its blocking state into its release state. This may allow a user to comfortably collapse the tent pole and stow away the tent. For example, the actuation element may be arranged on the outside of one of the pole elements. In particular, the actuation element may be pivotably mounted to one of the pole elements and/or the attachment sleeve. The biasing element may be arranged to press against the actuation element, for example pushing it towards a position corresponding to the locking state. The actuation element may be formed from a plastic material, for example in an injection molding process. The actuation element may also support the blocking element.

According to an embodiment of the tent pole, the blocking element may be molded into the actuation element, in particular insertion molded. Such a configuration may reduce manufacturing costs. In an insertion molding process, the blocking element may be inserted into the mold prior to injection a plastic material. For example, a metal pin is molded into the plastic actuation element. Alternatively, the blocking element and actuation element may have a unitarian one-piece design, reducing the overall number of parts.

According to an embodiment of the tent pole, the tent pole may comprise a third pole element connected to the second pole element. The first and third pole element may each be moveable relatively to the second pole element in a respective axial direction of the first and third pole element to extend or collapse the tent pole. The tent pole may comprise a corresponding fixation device for each pair of connected pole elements. Such a design of the tent pole may provide a particular long tent pole and/or tent pole with many adjustment possibilities. Such a design may also allow a more complex tent pole shape, such as an U-shape. For example, both the first and the third pole element may rest on the ground with the tent erected. Both sides can thus be adjusted in length, thus avoiding that a canopy supporting part tilts a lot when extending the tent pole and/or comes to rest at a different angle relative to the ground with the tent pole in the extended state as compared to the collapsed state. Movement of each pair of two connected pole elements may be controlled by a corresponding fixation device. The second pole element may have an essentially U-shaped, wherein the first pole element is arranged at an end of the second pole element and the third pole element is arranged at another end of the second pole element. The U-shape may be formed with two legs and a base section connecting the two legs and extending between the two legs, wherein the first pole element is arranged at one leg of the second pole element and the third pole element is arranged at the other leg of the second pole element. The U-shape allows a large headroom and a spacious tent. Each end of the tent pole, i.e. the first and third pole element, may form a bottom section of the telescopic tent pole. Adjusting a length at the two different ends of such a tent pole is normally difficult, since a too large difference in length at the two ends may cause balance problems and/or cause a telescopic adjustment to jam. The intermediate position, wherein the fixation device automatically prevents collapsing, may mitigate this issue and facilitate extending the pole and thus erecting the tent.

A second aspect relates to a tent pole element, in particular a tent pole element of the tent pole according to the first aspect. The tent pole element may be hollow with a side wall having a substantially trapezoidal cross section with two substantially parallel wall sections and two wall sections inclined to each other. Such a shape is cost-effective to manufacture, stable and prevents unwanted rotation relative to another pole element connected to this pole element. The shape may deviate from a geometrical perfect trapezoid due to curved side wall sections and/or curved corners. Further, the substantially parallel wall sections may not be mathematically parallel to each other due to a curved shape, for example having a convex or concave shape. The two wall sections may, for example, already be considered parallel if a straight line through both ends of each wall section are parallel to each other or even if generally extending in the same direction and/or with similar curves. For example, the tent pole element may be a hollow metal or plastic tube. The cross section may be taken orthogonal to a longitudinal extension of the tent pole. The tent pole may be essentially straight along its complete longitudinal extension or have a curved or cornered section. Usually, at least one section of the tent pole element is essentially straight and configured for a connection to another tent pole element to form a telescopic tent pole. In particular, the tent pole element may not have a substantially round, triangular or square shaped cross-section. For example, the tent pole cross-section may have only one axis of symmetry. The substantially trapezoidal shape can be formed by two substantially parallel wall sections with different lengths and two wall sections with substantially the same length.

According to an embodiment of the tent pole element, the tent pole element may comprise a section of the side wall with a contact surface configured for contacting a canopy of a tent having a convex shape. The surface may be curved outwards. Such a canopy contacting shape may protect the canopy, in particular its fabric, provide a smooth exterior, which may also prevent water accumulation on the canopy, and facilitate tightening of the tent. The convex shape may provide a large surface and radius and result in a smoother canopy surface with the tent erected.

According to an embodiment of the tent pole element, an outer side of a larger one of the two substantially parallel wall sections may have a convex shape. The larger one of the two substantially parallel wall sections may provide the largest support surface for the canopy, resulting in a large radius and smoother canopy surface with the tent erected. The outer convexly shaped side of the larger of two substantially parallel wall sections may be configured for contacting a tent canopy.

According to an embodiment of the tent pole element, an outer side of a shorter one of the two substantially parallel wall sections may have a concave shape. Such a design prevents risk of fold lines, in particular when bending a pole towards the concave side during manufacturing, for example to form a curved, cornered and/or U-shaped tent pole element, and may therefore facilitate manufacturing. Further, such a design may provide guidance to the blocking element for engagement with an engagement section, such as a hole, in the tent pole element and/or protect an engagement section by providing a recessed position.

According to an embodiment of the tent pole element, the two substantially parallel wall sections may be connected at each end with a radius to a respective one of the two wall sections inclined to each other. A larger radius may be formed at the longer of the two substantially parallel wall sections. The radius may form a rounded corner, facilitate manufacturing and protect the tent canopy.

The two inclined wall sections may have substantially the same length. The inclined wall sections may be straight for cost-efficiency or slightly convex to improve pole element stability. An angle of the inclined wall sections may be identical, resulting in a central axis of symmetry.

According to an embodiment of the tent pole, at least one of the tent pole elements may be configured as the pole element according to the second aspect.

A third aspect relates to a tent comprising a canopy and a telescopic tent pole according to the first aspect and/or a pole element according to the second aspect. Such a tent is particular sturdy, easy to erect and/or requires only a small storage space. When erected, the canopy may be held and tensioned by the tent poles and/or tent pole elements. The canopy can comprise a ground floor section or a ground floor may be formed by a separate element. The canopy can have windows and/or air circulation openings. The canopy can comprise sections configured for blocking or releasing respective window openings and/or air circulation openings. The canopy can be formed from a natural or artificial material, such as a plastic fabric. For example, the canopy can be formed from a textile material, such as silnylon, and have a rip-stop functionality.

According to an embodiment of the tent, the tent may be configured for attachment to a roof top of a vehicle, in particular to preinstalled rails of a motor vehicle roof. For such a tent, the tent pole according to the first aspect and/or the tent pole elements according to the second aspect are very suitable since they allow compact roof top storage and a sturdy tent, which is required for prolonged use. In roof top tents, maximum storage size and thus erected tent size is overall limited by the roof top size. Usually, the roof top tent in its storage state is not allowed to extend more than a couple of centimeters over the roof top in a width direction and/or beyond the limits of the vehicle exterior. Alternatively or additionally, the tent is configured to be folded between a storage state and an erected state, in particular by pivoting and/or extending or collapsing respective poles. For such a foldable tent, the tent pole according to the first aspect and/or the tent pole elements according to the second aspect are very suitable since disassembly of the tent poles is difficult in a foldable tent and the collapsed tent pole length may limit the minimal storage dimension at least in one direction. Further, the folding mechanism may stress the tent poles transversely to their longitudinal extension, wherein the non-circular shape renders the tent poles particular resistant to buckling due to loads in such a direction. The storage state may correspond to a folded state and/or the erected state to an unfolded state.

In the storage state, the tent may be stored in a roof top carrier box. The roof top carrier box may also be part of the tent, for example also forming part of its floor in the erected state. In the erected state, the tent has an interior space, in particular for one or more adults to sleep in, and/or a tensioned canopy, in particular configured to keep rain out of the interior. The tent may comprise a ladder allowing access to the interior from the ground when mounted to the vehicle.

According to an embodiment of the tent, the tent, in its folded state, may be configured to extend less than over the full width of the roof top of the vehicle, in particular to only substantially extending up to the middle in the width direction of the roof top of the vehicle, thus allowing attachment of further equipment, such as roof top carrier box, bike or canoe, to the roof top of the vehicle. This may provide a user with the opportunity of comfortably using his roof top tent in extended and equipment intensive outdoor activities.

A fourth aspect relates to a use of the telescopic tent pole according to the first aspect and/or the pole elements according to the second aspect in a folding vehicle roof top tent comprising a canopy.

A fifth aspect relates to a method of erecting a foldable roof top tent with at least one telescopic tent pole, in particular a tent according to the third aspect. The method may comprise the step of attaching the tent in a folded storage state to a roof top of a vehicle, in particular a preinstalled rail. The method may comprise the step of unfolding the tent from its folded storage state, in particular including pivoting of respective tent poles. The method may comprise the step of attaching a canopy to the tent poles. The method may comprise the step of extending the at least one telescopic tent pole from its collapsed state towards its extended state after unfolding the tent. The method may comprise the step of first extending another pole element and/or the tent pole further towards the extended state of a respective tent pole when reaching an intermediate position of a pole element corresponding to an intermediate state of the tent pole, wherein collapsing of the tent pole is prevented by a fixation device. The method may also involve storing the tent. For that purpose, respective tent poles may be collapsed. To permit collapsing from a certain state, a release actuation element can be actuated, for example by pushing. This may disengage a blocking element of a fixation device. Afterwards, the tent can be folded and/or stored in a storage box. The tent may remain attached to roof top in its folded storage state while allowing the vehicle to be used. For storing, the tent may be folded on the roof of the vehicle and the telescopic tent pole may be adjusted into the shortest length, such as the collapsed state, to find place inside the main panels of the tent in the storage state.

A user may fold out the tent like a book, go inside the still partially collapsed tent to extend the tent poles, for example one at a time to the intermediate and/or extended state. When extending the tent pole, the spring-loaded pin may automatically engage a first hole in a pole element. This first hole will hold the pole in place in the intermediate position. The user can repeat this process with other tent poles, or directly extend this tent pole to a final hole, such as a second hole further along the pole element. The user does not need to push a button to release the pin from the first hole to permit extension from the intermediate state. Instead, the user may simply extend the tent pole towards the next hole and the blocking element may pop out of engagement, for example due to a wedge shape of a pin. When arriving at the next hole, the blocking element may automatically engage this hole. In the extended state, the tent canopy may be fully stretched. When collapsing the tent, the user may push a release button in order to release the blocking element from the hole and release tension from the canvas.

Preferred embodiments and expedient developments of one aspect may also constitute preferred embodiments and expedient developments of other aspects. Other features of the present invention will be apparent from consideration of the information contained above as well as in or in combination with the following detailed description, drawings and claims. The present invention is illustrated by way of example, and not by way of limitation, in the figures of the accompanying drawings.

BRIEF DESCRIPTION OF FIGURES

FIG. 5 shows, in a perspective view, a pole element of the tent poles according to FIG. 2a.

FIG. 6 shows, in a sectional view, a cross-section of the tent poles according to FIG. 2a.

DETAILED DESCRIPTION

Figure 1:
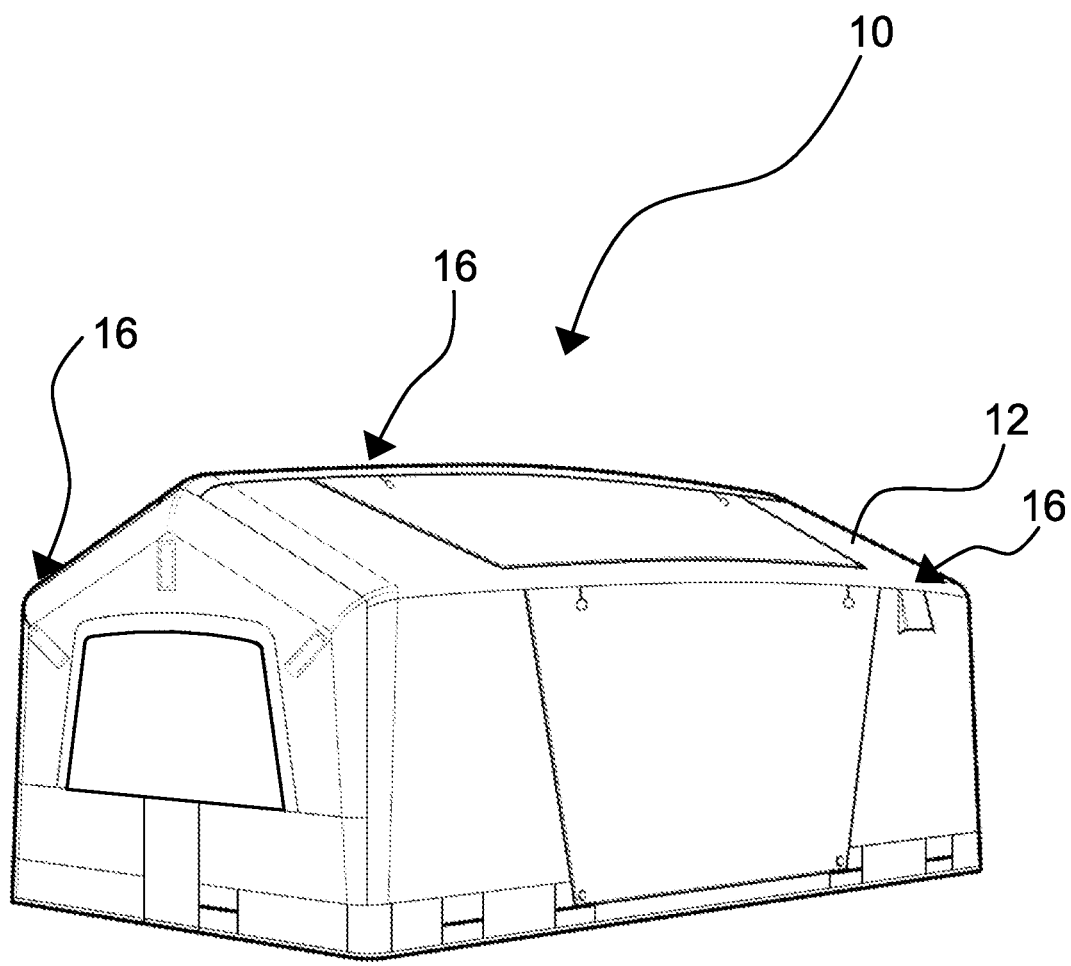
FIG. 1 shows, in a perspective view, a foldable tent for a roof top of a motor vehicle.

FIG. 1 shows a foldable roof top tent 10 in its erected state, which is intended to be mounted with its base to a motor vehicle. When mounted to the vehicle, a short side of the tent 10 extends in the width direction of the vehicle and a long side in the forward-backward direction. The tent 10 comprises a canopy 12 and limits an interior living space.

The tent 10 has several windows, an entrance that may be reached by a ladder of the tent 10 and air openings. The tent 10 is kept erected by three U-shaped tent poles 14, as shown in FIGS. 2a-2c, which stretch the canopy 12 along its three upper edges 16 extending along a longitudinal length of the tent 10.

In its folded storage state, the three edges 16 of the tent 10 are essentially arranged adjacent to each other. The tent 10 may be folded along its longitudinal extension in the middle like a book. In its folded storage state, the tent 10 is arranged at one side of the vehicle does not extend beyond the half-width of the vehicle, allowing the transport of other cargo on the roof top, such as sport equipment, right next to the tent 10.

Figure 2A:
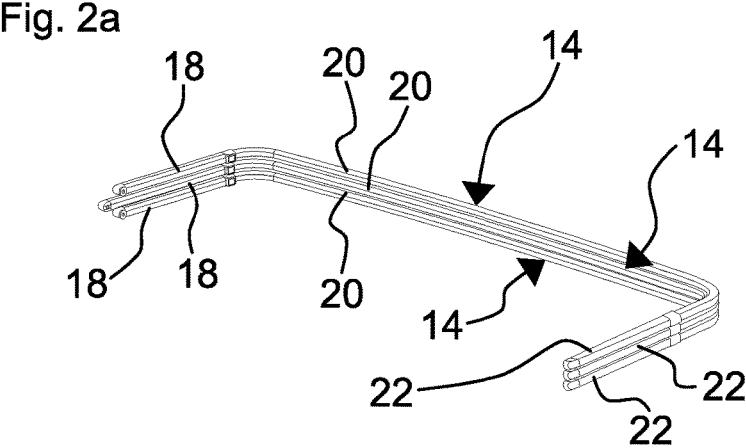
FIG. 2a shows, in a perspective view, tent poles of the tent according to FIG. 1 in a collapsed and folded storage state, corresponding to a storage state of the tent.
Figure 2B:
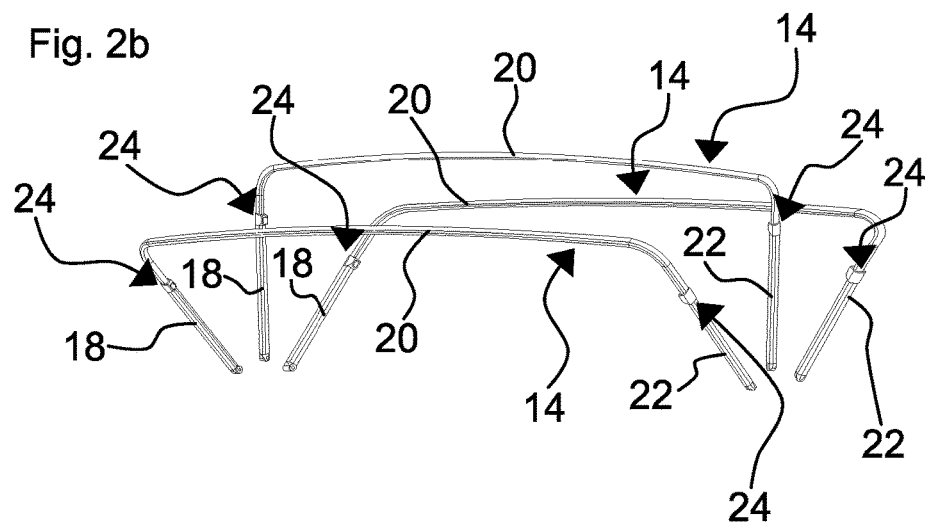
FIG. 2b shows, in a perspective view, tent poles according to FIG. 2a in a collapsed and unfolded state.
Figure 2C:
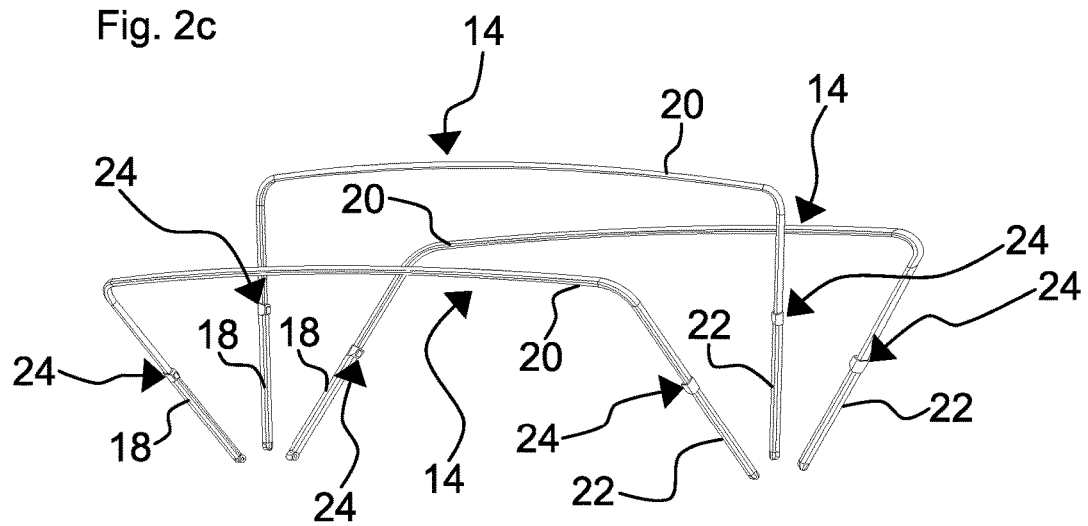
FIG. 2c shows, in a perspective view, tent poles of the tent according to FIG. 2a in an extended and unfolded state, corresponding to an erected state of the tent.

The three tent poles 14 can be seen in a folded state in FIG. 2a. Each tent pole 14 is U-shaped and comprises a straight first pole element 18, a U-shaped second pole element 20 and a straight third pole element 22. The second pole element 20 is inserted into the hollow first and third pole elements 18, 22 with a respective end. The three pole elements 18, 20, 22 of each tent pole 14 are thus connected pairwise. The second pole element 20 may also be hollow. The first and third pole elements 18, 22 are each pivotably connected to a floor of the tent, which may be formed by an open roof top carrier box. FIG. 2b illustrates the tent poles 14 pivoted into an unfolded state, wherein at least the second pole elements 20 are spaced apart to each other, similar to the top edges 16 of the erected tent 10.

The tent poles 14 are configured as telescopic tent poles each having a length which may be adjusted by moving the second pole element 20 relative to the first and third pole element 18, 22. FIGS. 2a and 2b each show the tent poles 14 in a collapsed state. Said collapsed state allows space-efficient storage of the tent 10. However, an interior height of the tent would be limited by such a length. FIG. 2c shows an extended state of the tent poles 14. As can be taken from a comparison of FIGS. 2b and 2c, a height of an interior space of the tent 10 is larger in the extended state. For example, an interior height of the tent 10 may be larger than half the width of the vehicle roof top while still allowing a corresponding storage dimension of the tent 10 to be smaller than such a width. For extending the tent poles 14, the second pole element 20 may be pulled or pushed out of the first and third pole element 18, 22, thus telescopically extending a length of the tent poles 14 and therefore also height of the tent 10.

Figure 3:
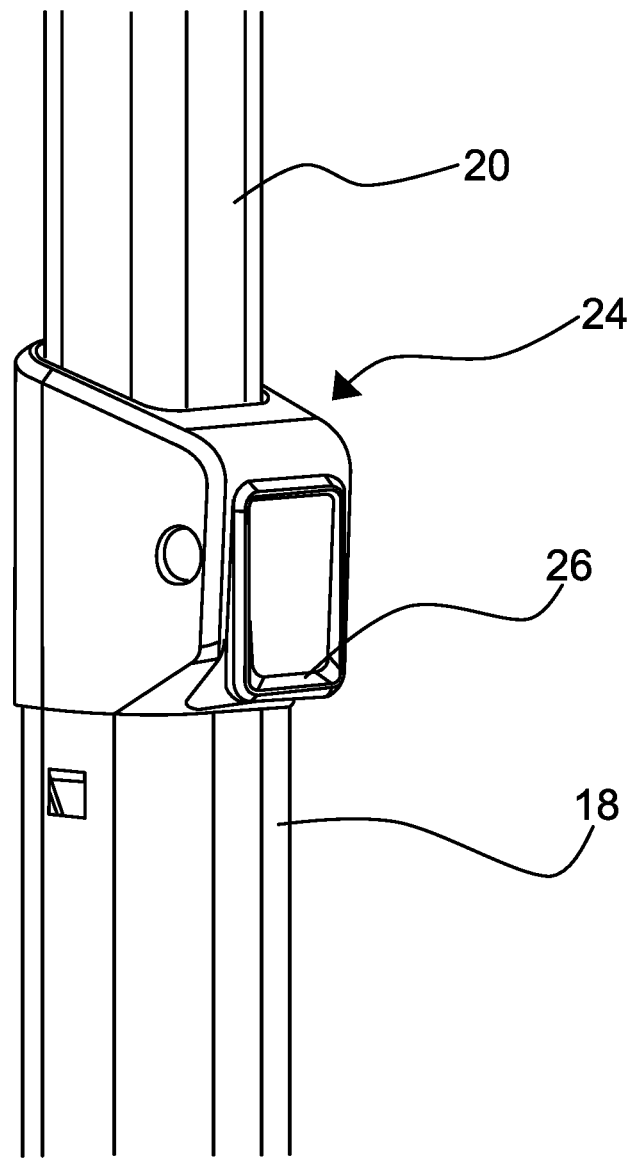
FIG. 3 shows, in a side view, a section of the tent poles according to FIG. 2a, illustrating a fixation device.

FIG. 3 illustrates a fixation device 24, which is provided at each respective connection of the first pole element 18 and the third pole element 22 to the second pole element 20. The fixation device 24 is configured to be adjustable between a blocking state and a release state. In the blocking state, the fixation device 24 is configured to prevent collapsing of the tent pole 14 in the extended state by preventing the second pole element 20 to be pushed into the first or respectively third pole element 18, 22. The fixation device 24 is biased towards its blocking state and thus automatically enters the blocking state once the extended position of the respective pair of pole elements relative to each other is reached. Hence, by extending the tent pole 14, the pole elements 18, 20, 22 are automatically fixed in their extended position and thus the tent pole 14 in its extended state. By pushing a release actuation element 26 of the fixation device 24, which is configured as a button 26, the fixation device 24 may be adjusted into its release state, allowing collapsing of the tent poles 14 by pushing the second pole element 20 into the first and third pole element 18, 22, respectively.

To comfortably allow a user to erect the large tent 10 with a potentially heavy canopy 12, each tent pole 14 also has an intermediate state between the collapsed and extended state. In its blocking state, the fixation device 24 is configured to prevent collapsing of the respective tent pole 14 in the intermediate state. A user may therefore, for example, only extend the tent poles 14 sequentially partially to their respective intermediate state and then sequentially fully extend the tent poles 14 to their respective extended state. Like the extended state, the fixation device 24 may automatically fix the respective pair of pole elements to each other, thus preventing collapsing once their relative position corresponding to the intermediate position is reached. To facilitate further extension of the tent poles 14 from the intermediate state, the fixation device 24 is configured to permit further extending of the respective tent pole 14 towards its extended state even in its blocking state. I.e. the respective pair of pole elements may still be moved relatively to each other in a direction causing further extension of the tent pole 14 without needing to press the release actuation element 26. By comparison, a movement of the respective pair of pole elements relative to each other in a direction causing collapsing of the tent pole 14 in the intermediate state is prevented by the fixation device 24 due to the fixation device 24 in the blocking state.

Figure 4B:
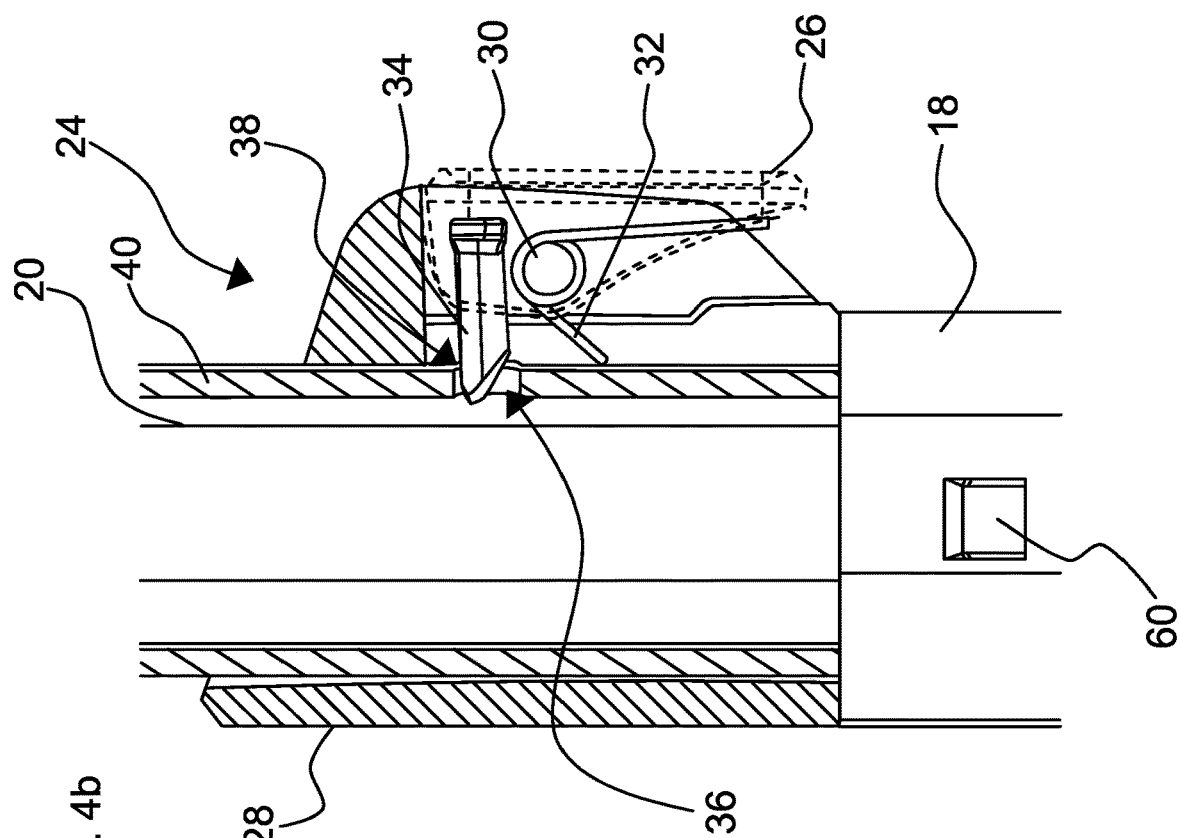
FIG. 4b shows, in a sectional side view, the fixation device in its blocking state.
Figure 4A:
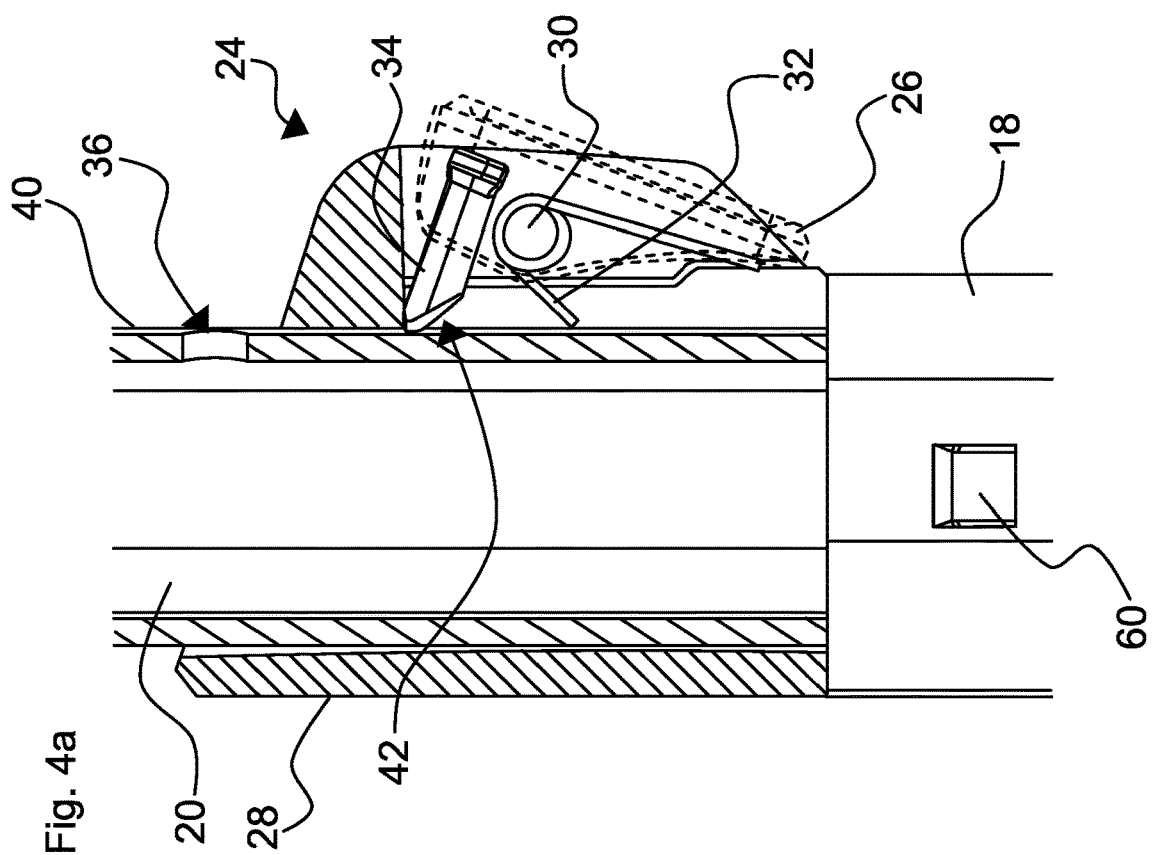
FIG. 4a shows, in a sectional side view, the fixation device in its release state.

FIGS. 4a and 4b illustrate the two different states of the fixation device 24 and its components in a partially sectional view. The fixation device 24 comprises an attachment sleeve 28, which is shown in a sectional view. The sleeve 28 is mounted to the lower first pole element 18 at a snap coupling at an inwardly protruding lip 60 of the first pole element 18. The release actuation element 26 is pivotably mounted to the sleeve 28 with a rivet 30. For illustration of the fixation device 24 mechanics, the actuation element 26 is shown transparent. The fixation device 24 further comprises a spring 32 mounted to the rivet 30, which biases the fixation device towards its blocking state shown in FIG. 4b. The fixation device 24 also comprises a blocking element 34 in form of a pin 34 that is configured to engage an engagement section on the upper second pole element 20 in the blocking state. The second pole element 20 is also shown in a sectional view. As can be seen in FIG. 4a, the fixation device 24 is in the release state, allowing the second pole element 20 to freely move relatively to the first pole element 18 along a common longitudinal axis in both directions.

In FIG. 4b, the second pole element 20 has been pulled out of the first pole element 18 far enough to reach the intermediate position. The blocking element 34 has been pushed by the spring 32 into the hole 36, which forms the engagement section on the second pole element 20. The second pole element 20 is therefore blocked from moving towards the collapsed state of the tent pole 14, which is the downward direction in the image plane of FIG. 4b. Here, a straight engagement surface 38 faces in such a direction by being orthogonally arranged thereto in the blocking state of the fixation device 24. A movement towards collapsing is only allowed once the actuation element 26 is pressed, disengaging the blocking element 34 from the hole 36. As can be seen in FIG. 4b, a straight side forming the engagement surface 38 engages a corresponding section of the side wall 40 of the second pole element 20.

However, if the second pole element 20 is moved further towards an extended state, which is the upward direction in the image plane of FIG. 4b, an inclined engagement surface 42 will cause the blocking element 34 to be pushed out of the hole 36, causing disengagement and adjustment of the fixation device 24 into the release state, as shown in FIG. 4a.

Hence, an adjustment of the tent pole 14 towards the extended state is not blocked in the intermediate state despite the blocking element 34 engaging the hole 36. The inclined engagement surface 42 is tilted to the extension direction, i.e. not being arranged orthogonally thereto. An end of the blocking element 34 configured for engaging holes on the second pole element 20 is wedge-shaped.

Figure 5:
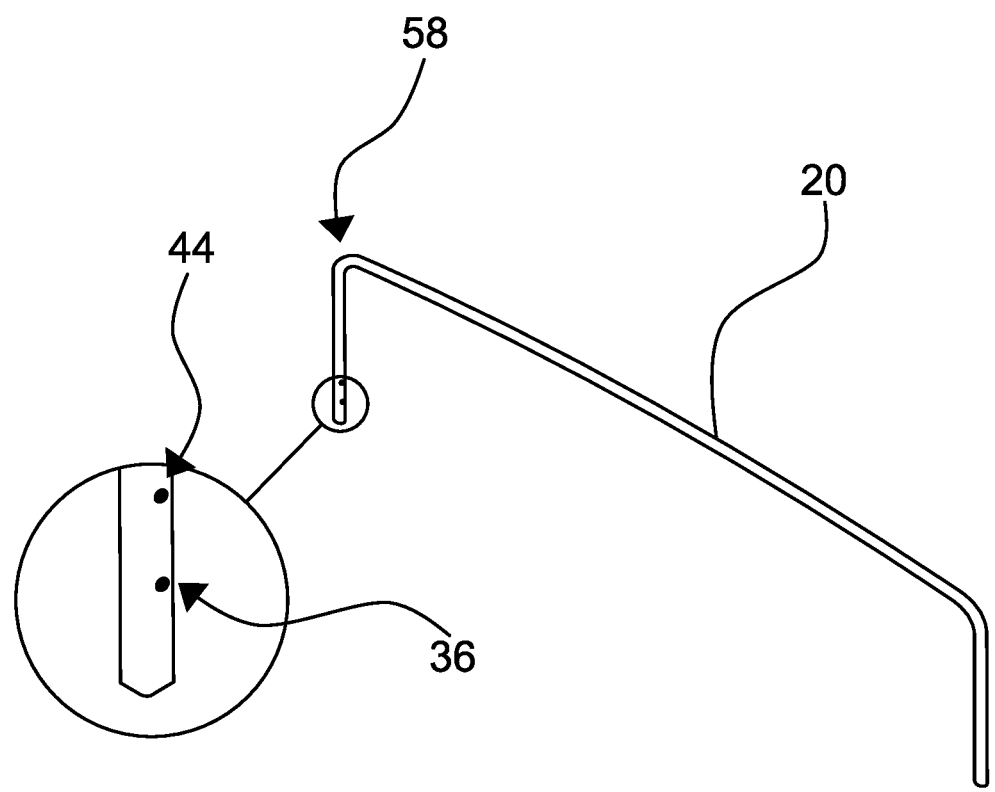

Above the hole 36, there is a second hole 44 formed in the side wall of the second pole element 20, as can be seen in the enlarged detail in FIG. 5. The second hole 44 corresponds to the extended state of the tent pole 14. Like the hole 36, the blocking element 34 will also automatically engage the hole 44, preventing collapsing of the tent pole 14 from the extended state. A side wall section limiting the hole 44 may be formed in such a way that the inclined engagement surface 42 may not automatically disengage the blocking element 34 when extending the tent pole 14 further, thus preventing overextension. Alternatively or additionally, there may be an end stop provided on at least one of the first and second pole element 18, 20.

Figure 6:
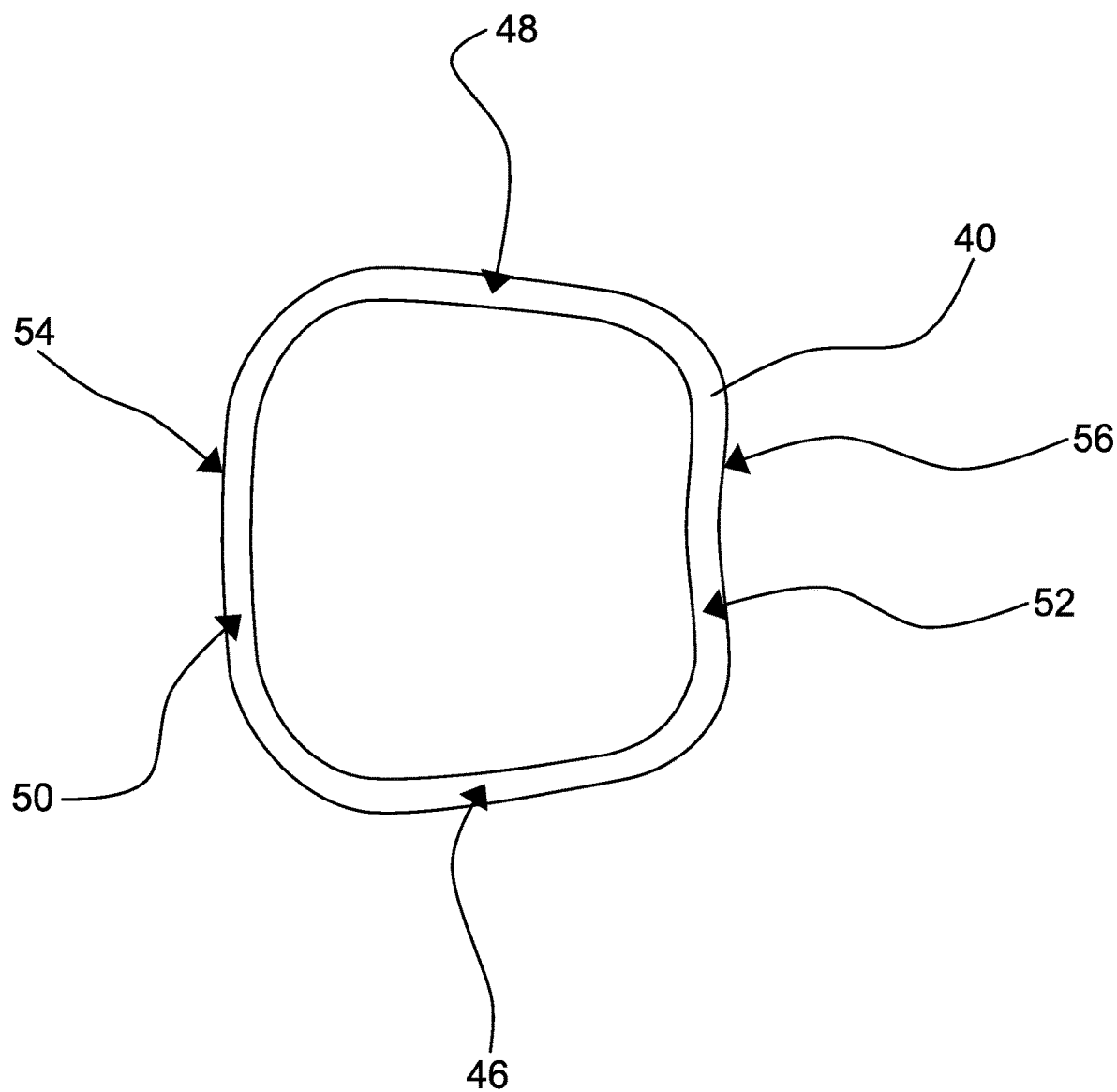

FIG. 6 illustrates in a cross-section taken along the longitudinal extension of the pole elements 18, 20, 22 their cross-sectional shape. The cross sections of the different pole elements 18, 20, 22 correspond to each other, although the dimensions of the second pole element 20 will be smaller than those of the first and third pole element 18, 22 to allow insertion. As can be seen, the cross section is substantially trapezoidal. The cross section is formed by two inclined wall sections 46, 48, which are of equal length and tilted towards an axis of symmetry with one end. The two inclined wall sections are connected to each other via a longer wall section 50 and a shorter wall section 52. The two wall sections are substantially parallel to each other, although not perfectly due to a curvature with different radii. The two inclined wall sections 46, 48 may also be slightly curved, for example, outward, or straight. Each wall section 46, 48, 50, 52 is connected to an adjacent wall section at each end with a curved corner.

An outer side 54 of the longer parallel wall section 50 is shaped convex. The outer side 54 is configured for contacting the canopy 12. Due to the convex shape, a smooth canopy 12 and fabric protection is achieved. The outer side 56 of the shorter parallel wall section 52 is concavely shaped. This may reduce a risk of fold lines in the material of the side wall 40 when bending a pole element, such as for manufacturing the corner section 58 of the U-shaped second pole element 20 indicated in FIG. 5. Further, this may protect the engagement section of a pole element, such as the holes 36, 44. For example, even sharp edges cannot be reached by a user or the canopy 12 fabric due to the holes 36, 44 being recessed in the concavely shaped wall section 52.

What is claimed is:

1. A telescopic tent pole extendable between an extended state and a collapsed state, comprising:
 a first pole element and a second pole element connected to each other, wherein the first pole element and second pole element are moveable relative to each other along an axis to extend or collapse the telescopic tent pole, wherein the first pole element is configured to be coupled to a floor of a tent; and
 a fixation device configured to be adjustable between a blocking state and a release state,
 wherein the fixation device is biased towards the blocking state,
 wherein the fixation device, in the blocking state, is configured to prevent collapsing of the telescopic tent pole in the extended state,
 wherein the fixation device, in the blocking state, is configured to prevent collapsing of the tent pole in at least one intermediate state of the telescopic tent pole between the collapsed state and the extended state,
 wherein the fixation device, in the blocking state, is configured to permit further extending of the telescopic tent pole towards the extended state from the at least one intermediate state of the tent pole,
 wherein the fixation device comprises a blocking element configured to engage one of the first and second pole elements, and
 wherein the blocking element has a first engagement surface on a first side of the blocking element facing opposite to an extension direction, wherein the first engagement surface is inclined relative to the extension direction, the extension direction extending away from the floor along the axis.

2. The telescopic tent pole according to claim 1, wherein at least one of the first and second pole elements comprises an engagement section, wherein the at least one intermediate state is predetermined by the engagement section, and wherein the fixation device in the blocking state engages the engagement section to prevent collapsing of the telescopic tent pole.

3. The telescopic tent pole according to claim 1, wherein the fixation device comprises a biasing element, configured to force the blocking element into engagement with one of the first and second pole elements.

4. The telescopic tent pole according to claim 3,
 wherein the blocking element has a second engagement surface on a second side of the blocking element facing in the extension direction, wherein the second engagement surface is orthogonal to the extension direction.

5. The telescopic tent pole according to claim 1, wherein at least one of the first and second pole elements has a non-circular cross section.

6. The telescopic tent pole according to claim 1, wherein the fixation device comprises a release actuation element for adjusting the fixation device from the blocking state into the release state.

7. The telescopic tent pole according to claim 6, wherein the blocking element is molded into the actuation element.

8. The telescopic tent pole according to claim 1, further comprising:
 a third pole element connected to the second pole element; and
 a second fixation device connected to the second pole element and the third pole element,
 wherein the first and third pole elements are each moveable relative to the second pole element along a respective axis of the first and third pole elements to extend or collapse the telescopic tent pole.

9. The telescopic tent pole according to claim 1, wherein at least one of the first and second pole elements is hollow with a side wall having a substantially trapezoidal cross section with two substantially parallel wall sections and two wall sections inclined to each other.

10. A tent, comprising:
 a canopy; and
 a telescopic tent pole extendable between an extended state and a collapsed state, comprising:
  a first pole element and a second pole element connected to each other, wherein the first pole element and the second pole element are moveable relative to each other along an axis to extend or collapse the telescopic tent pole, wherein the first pole element is configured to be coupled to a floor of the tent, and a fixation device, configured to be adjustable between a blocking state and a release state, wherein the fixation device is biased towards the blocking state, wherein the fixation device, in the blocking state, is configured to prevent collapsing of the telescopic tent pole in the extended state, wherein the fixation device, in the blocking state, is configured to prevent collapsing of the telescopic tent pole in at least one intermediate state of the telescopic tent pole between the collapsed state and the extended state, wherein the fixation device, in the blocking state, is configured to permit further extending of the telescopic tent pole towards the extended state from the at least one intermediate state, wherein the fixation device comprises a blocking element configured to engage one of the first and second pole elements, wherein the blocking element has a first engagement surface on a first side of the blocking element facing opposite to an extension direction, wherein the first engagement surface is inclined relative to the extension direction, the extension direction extending away from the floor along the axis, and wherein, in the extended state, the canopy at least partially defines an interior space of the tent, and wherein the tent is configured to attach to a roof top of a vehicle.

11. The tent according to claim 10, wherein the tent is configured to be folded between a storage state and an erected state.

12. The tent according to claim 11, wherein the tent in the storage state is configured to extend less than over the full width of the roof top of the vehicle, allowing attachment of further equipment to the roof top of the vehicle.

13. The tent according to claim 10, wherein the tent is configured to attach to a utility rail of the vehicle.

* * * * *